United States Patent
Kanp et al.

(10) Patent No.: US 11,442,815 B2
(45) Date of Patent: Sep. 13, 2022

(54) COORDINATING BACKUP CONFIGURATIONS FOR A DATA PROTECTION ENVIRONMENT IMPLEMENTING MULTIPLE TYPES OF REPLICATION

(71) Applicant: EMC IP Holding Company LLC, Hopkinton, MA (US)

(72) Inventors: Rintu Kanp, West Bengal (IN); Razi Syed, Bangalore (IN); Sanjeev Lohchab, Bangalore (IN); Upanshu Singhal, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 249 days.

(21) Appl. No.: 16/832,298

(22) Filed: Mar. 27, 2020

(65) Prior Publication Data

US 2021/0334168 A1  Oct. 28, 2021

(51) Int. Cl.
    *G06F 7/00*      (2006.01)
    *G06F 11/14*      (2006.01)
    *G06F 16/27*      (2019.01)
    *G06F 16/23*      (2019.01)

(52) U.S. Cl.
    CPC ...... *G06F 11/1458* (2013.01); *G06F 16/2365* (2019.01); *G06F 16/27* (2019.01); *G06F 2201/84* (2013.01)

(58) Field of Classification Search
CPC .. G06F 11/1458; G06F 16/27; G06F 16/2365; G06F 2201/84
USPC ................................ 707/600–899
See application file for complete search history.

(56) References Cited

U.S. PATENT DOCUMENTS

2019/0324865 A1* 10/2019 Weissman ........... G06F 11/1471

* cited by examiner

*Primary Examiner* — Isaac M Woo
(74) *Attorney, Agent, or Firm* — Dergosits & Noah LLP; Todd A. Noah

(57) ABSTRACT

Described is a system for coordinating backup configurations for a data protection environment that implements multiple types of replication. The system may provide an efficient coordination tool that discovers the types of replication implemented by storage arrays within a data protection environment and then processes backup data according to the types of replication. For example, as part of a data protection policy, a backup facility may continuously create point-in-time copies (e.g. snapshots) of storage resources by leveraging consistency groups. Accordingly, the system may categorize such consistency groups based on the type of replication implemented by associated storage arrays. Based on the categorization, the system coordinate a backup process for all storage arrays associated with the backup facility without requiring specialized hardware.

20 Claims, 4 Drawing Sheets

COORDINATING BACKUP CONFIGURATIONS FOR A DATA PROTECTION ENVIRONMENT IMPLEMENTING MULTIPLE TYPES OF REPLICATION

TECHNICAL FIELD

This disclosure relates to data storage systems, and more particularly, performing a backup configuration for data within a data storage system.

BACKGROUND

Data storage systems (or on-demand storage services) may provide various tools that are crucial for enterprise level network clients. For example, clients may rely on such systems to efficiently back up and recover data in the event of user error, data loss, system outages, hardware failure, or other catastrophic events to allow business applications to remain in service or quickly come back up to service. Accordingly, as part of a data protection service, providers may provide tools to perform replication of data. For example, such replication tools may allow clients to rollback their data back to a previous state by creating point-in-time backups (or "snapshots") of data. Such backups may be stored on various types of underlying storage infrastructure. For example, backups may be stored on various types of storage arrays. However, not all storage arrays may be compatible with all types of replication technology. Accordingly, coordination of replication technologies for large enterprise systems (e.g. across multiple facilities) that use various types of storage arrays becomes increasingly complex. Moreover, clients may even be required to deploy specialized hardware components to perform such coordination. Thus, there is a continued need to provide efficient replication management and coordination for large data systems.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1:
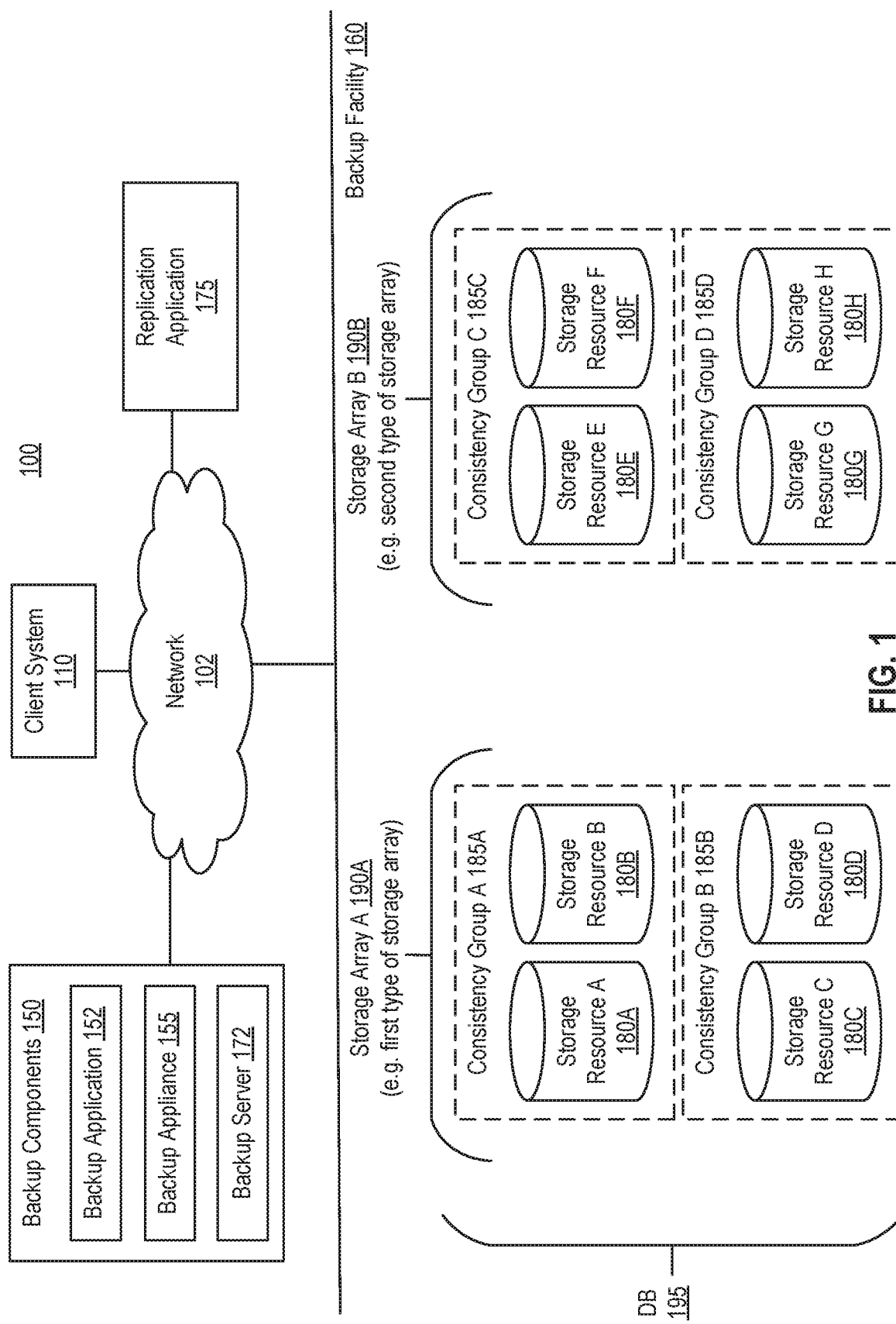
FIG. 1 is a block diagram illustrating an example operating environment for coordinating backup configurations according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for coordinating backup configurations for a data protection environment that implements multiple types of replication. The system may provide an efficient coordination tool that discovers the types of replication implemented by particular storage arrays and then processes backup data according to the discovered types of replication. For example, the system may provide a mechanism to coordinate backups for a backup facility that utilizes different generations of backup hardware that may have different replication mode capabilities. For instance, as part of a data protection policy, a backup facility may continuously create point-in-time copies (e.g. snapshots) of storage resources that are associated with consistency groups. Accordingly, the system may categorize such consistency groups based on the type of replication implemented with the underlying storage arrays. Based on the categorizations, the system may coordinate a backup process for all the storage arrays associated with the backup facility without requiring specialized hardware.

To provide such a capability, the system may identify storage resources and consistency groups of a backup facility. The system may then categorize the consistency groups based on the type of replication implemented by the storage array providing the storage resources of the consistency group. As a result, the system may create bookmarked snapshots of consistency groups based on the categorization. For example, the system may create one or more sequential bookmarks or parallel bookmarks based on the replication capabilities of the associated storage arrays. Accordingly, the system may perform a centralized backup coordination for multiple types of storage arrays that support different replication modes.

In some embodiments, such a system may be provided within an operating environment. An example of such an operating environment is further described herein with reference to FIG. 1. However, in general, embodiments of the disclosure may include and/or be implemented in an operating environment including a cloud-based services environment that may be, or include, a data protection operating environment that includes data protection and backup services. For example, at least some functionality may be provided by, or implemented in connection with, various platforms such as the Data Domain™ data protection platform provided by Dell EMC™ Corporation (Dell EMC), and associated systems, methods, and components, although use of this particular platform is provided only by way of illustration and is not required.

In some embodiments, the operating environment may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the storage of data can employ any suitable storage technique (e.g. file-based, block-based, object-based storage, etc.), infrastructure (e.g. cloud-based), or hardware (e.g. Solid State Drive (SSD), Hard Disk Drive (HDD), etc.).

More specifically, and with reference to FIG. 1, shown is a block diagram illustrating an example of an operating environment 100 for coordinating backup configurations according to one or more embodiments of the disclosure.

As shown, the environment 100 may include a client system 110, backup components 150, a replication application 175, and a backup facility 160, which may be associated with one more storage arrays 190. The components of operating environment 100 may interact via a network 102, which may be any type of wired or wireless network including a local area network (LAN), a wide area network (WAN), or a direct communication link, or other suitable connection. In some embodiments, the network 102 may include a dedicated network or subnetwork that interconnects and presents a shared pool of storage devices to multiple servers. For example, the network 102 may include a storage area network (SAN).

In some embodiments, components of the operating environment 100 may provide data protection and recovery services to a client (or customer) associated with the client system 110. For example, these services may include a data protection service that includes replicating data stored within the backup facility 160. The replication technique used by the operating environment 100 may include any suitable technique. In some embodiments, the replication may include creating point-in-time copies or backups of data. In some embodiments, these point-in-time copies may be created as a snapshot. For example, as further described herein, a snapshot may be created for a storage resource 180, consistency group 185, or group set.

In general, a snapshot may employ a redirect on write (ROW) technique. For instance, with redirect on write, new writes to snapped storage resources or their snapshots are redirected to a new location in the same storage pool, and pointers are updated to point to the new location. For example, as data is written to a storage resource (e.g. a logical volume), two different versions of data are maintained: a first version of the data represents the original data that existed when the snapshot was initiated, and a second version of the data represents the new data being written. For example, any subsequent writes to the same section overwrite the second version. In some embodiments, a snapshot does not replicate a full copy of the original data. Rather, a snapshot may only store differences between a current version of the data and the version of the data at the point in time when the snapshot was taken. Moreover, since a snapshot may be initiated by creating a table of pointers to actual data within, for example, the same storage pool (or resource), there is a relatively low resource overhead and a time requirement for creating a snapshot. As a result, snapshots are efficient for recovering from various types of errors. For example, if a database includes data for which a point-in-time copy is made at 10:00 a.m., and a user inadvertently erases important data at 11:00 a.m. (or a program error causes corruption of the data for the database), then it is possible to recover the 10:00 a.m. version of the data 161 using a snapshot.

It should be noted that there are many different specific mechanisms for providing snapshot copies, see, for example, U.S. Pat. No. 7,340,489 to Vishlitzky, et al., entitled "Virtual Storage Devices," and U.S. Pat. No. 6,792,518 to Armangau et al., entitled "Data Storage System Having Mata [Meta] Bit Maps for Indicating Whether Data Blocks are Invalid in Snapshot Copies," both of which are incorporated by reference herein in their entirety, and both of which are assigned to EMC IP Holding Company LLC.

Returning to diagram 100, the client system (or source system) 110 may act as a client from which data to be backed-up originates. The client system 110 may host (or include, store, etc.) one or more client applications, and store data that may be protected as with a backup facility 160. In some embodiments, the client system 110 may be considered a host device. In addition, in some embodiments, the client system 110 may be in the form of a VM.

The backup components 150 may include a backup application 152 that performs (or manages, coordinates, etc.) the creation and recovery (or restoration) of data as part of a data protection service. For example, data stored within the client system 110 may be communicated from the client system 110 to the backup application 152 for storage within the backup facility 160. In addition, in some embodiments, data within the backup facility 160 may also be the source of data to be backed-up. In some embodiments, the backup application 152 may cooperate with a backup client application of the client system 110 or backup facility 160 to back up client data. In some embodiments, the backup application 152 may be a part of, or work in conjunction with, a backup appliance 155. For example, the backup (or storage) appliance 155 may include a Dell EMC CloudBoost appliance, although any suitable appliance is contemplated. In addition, the backup components 150 may include one or more of a backup server 172 that may be implemented in conjunction with a Data Domain deduplication storage server provided by Dell EMC for use with Data Domain™ Restorer (DDR) storage devices. In some embodiments, the backup server 172 may be a Dell EMC Avamar server or a Dell EMC Networker server, although no particular server is required, and other backup and storage system configuration are contemplated. It should be noted that the backup components 150 (e.g. backup application 152, backup appliance 155, or backup server 172) can be implemented in various forms, such as a virtual, physical, or native public cloud appliance to fit the requirements of a particular configuration, and the backup application 152 can be used with various types of data protection environments, including public and private object storage clouds.

The operating environment 100 may also include a backup facility 160. As shown, the backup facility 160 may maintain a database (DB) 195. For example, the database 195 may store backup data (and metadata) including point-in-time copies of such data. In some embodiments, the backup facility may be associated with managing electronic health records (EHR), although any type of data management is contemplated. For example, components of operating environment 100 may work in conjunction with various EHR platforms (e.g. MEDITECH platform). In some embodiments, the backup facility 160 may implement a continuous data protection service. For example, the backup facility 160 may work in conjunction with backup components 150 to provide data backup and protection functionality. For example, the backup facility 160 (e.g. a component of a MEDITECH platform) may work with various components (e.g. NetWorker Module for MEDITECH provided by Dell EMC) that are associated with a data protection platform.

As shown, the backup facility 160 may include, or be associated with, one or more storage arrays 190. A storage array 190 may include a set of storage resources 180 that store data of the database 195. As referred to herein, in some embodiments, a storage resource 180 may include an addressable and configurable storage instance that may be associated with a specific quantity of storage. For example, a storage resource may include a logical unit number (LUN), which may be logical unit of block storage that is created as part of a pool. As shown, storage resources 180 may be part of (or included, associated with, etc.) a consistency group 185. In other words, one or more storage resources 180 may be grouped into consistency groups 185. As referred to herein, in some embodiments, a consistency group may include an addressable instance of storage that can contain one or more storage resources that are grouped together so that storage operations on the consistency group affect all the storage resources (e.g. LUNs) contained in the group. Accordingly, a consistency group provides recovery consistency if one or more storage resources are dependent upon each other. For example, a snapshot taken of a consistency group would apply to all LUNs within the group. In some embodiments, as further described herein, one or more consistency groups may be grouped together to form a group set. As referred to herein, in some embodiments, a group set may include a collection of consistency groups. For example, the system may apply parallel bookmarks to a group set at a user-defined frequency. For example, group sets may be used for consistency groups that are dependent upon one another or that operate together as a single unit.

The replication application 175 may coordinate (or manage, orchestrate, execute, automate, etc.) various data protection operations (or processes, methods, etc.). For example, these operations may include coordinating backup and recovery procedures associated with storage resources 180. Accordingly, the replication application 175 may provide an interface that allows a user to perform various operations such as managing storage resources 180, consistency groups 185, and group sets. In some embodiments, the replication application 175 may be part of (or work in conjunction with) one or more of the backup components 150 (e.g. backup server 172). For example, the replication application 175, may be part of a recovery platform (e.g. RecoveryPoint platform provided by Dell EMC) that works in conjunction with the backup facility 160. However, the replication application 175 may also be part of the client system 110, storage array 190, a separate device, or a combination thereof. In addition, in some embodiments, the replication application 175 may be part of, or work in conjunction with, an operating system of a storage system. For example, the replication application 175 may direct (or control, initiate, etc.) other components of the operating environment 100 to perform various operations as further described herein.

Figure 2:
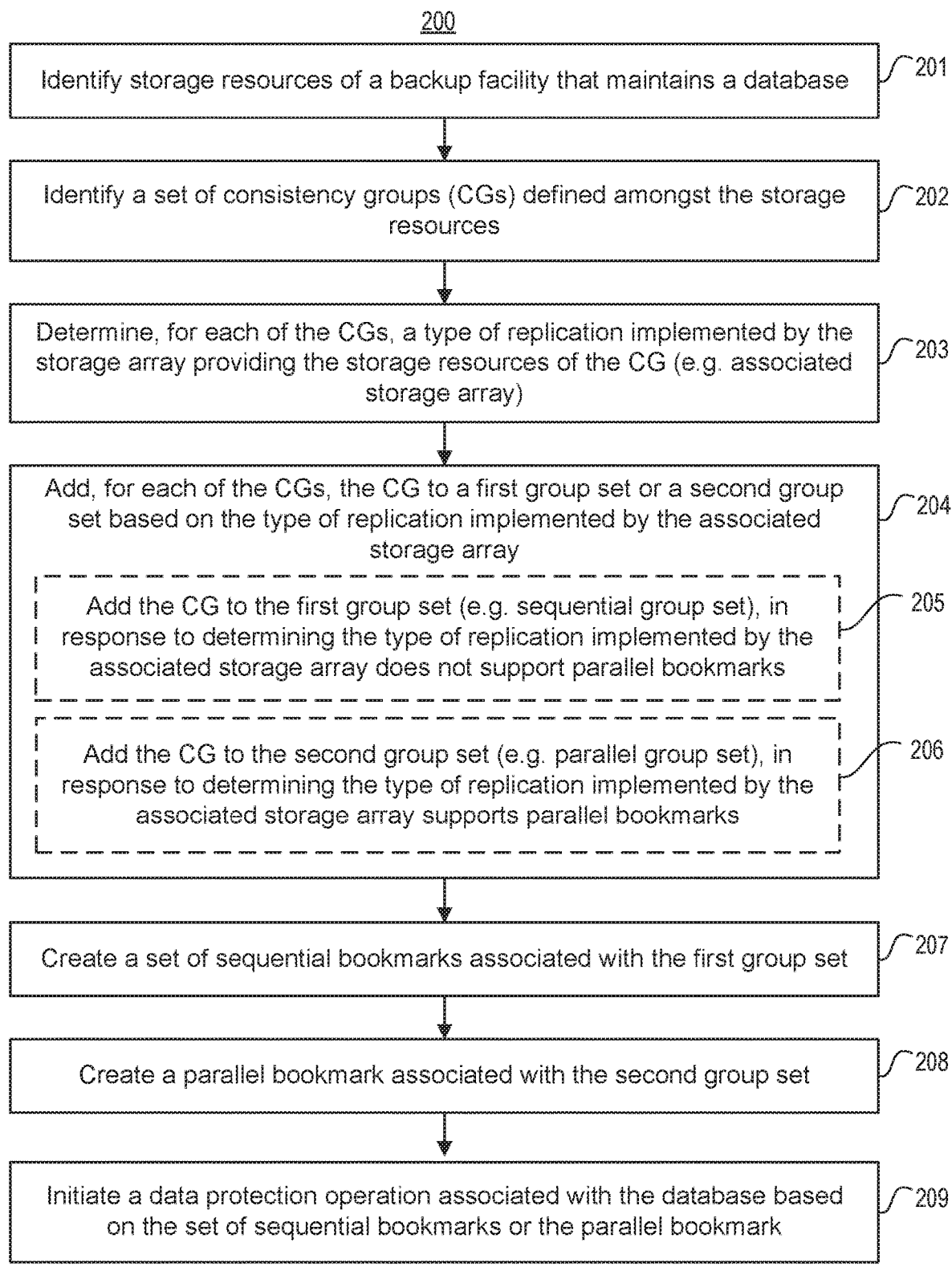
FIG. 2 is a flow diagram illustrating an example method of coordinating backup configurations associated with storage arrays implementing multiple types of replication according to one or more embodiments of the disclosure.

FIG. 2 is a flow diagram 200 illustrating an example method of coordinating backup configurations associated with storage arrays implementing multiple types of replication according to one or more embodiments of the disclosure. Process 200 may use processing logic, which may include software, hardware, or a combination thereof. For example, process 200 may be performed by a system including one or more components (e.g. replication application 175) described in operating environment 100.

In 201, the system (e.g. replication application 175) may identify storage resources (e.g. storage resources 180) of a backup facility (e.g. backup facility 160) that maintains a database (e.g. database 195). In some embodiments, the backup facility may be associated with (or provide, include, etc.) one or more storage arrays (e.g. storage arrays 190A-190B) that provide the storage resources for the database. For example, a storage resource may include a LUN. For instance, using diagram 100 as an example, the system may identify that storage resources 180A-180H are associated with backup facility 160.

In some embodiments, identifying storage resources of a backup facility may include identifying a world wide name (WWN) of the storage resources associated with the backup facility. For example, the storage resources may be identified using a command associated with the backup facility. For instance, a census (or query) command may be used to get a list of the LUNs that are associated with a database provided by the backup facility.

In 202, the system may identify a set of consistency groups defined amongst the storage resources. For example, a set of storage resources may be associated with (or be part of) a consistency group (e.g. consistency group 185). Accordingly, storage resources may belong to a particular consistency group. As described, a consistency group provides recovery consistency if one or more storage resources are dependent upon each other.

In some embodiments, the system may perform (or initiate, execute, etc.) a command, via an application programming interface (API), of the storage array (or other component) to obtain the set of consistency groups. For example, the system may perform a query (or census) command to obtain a list of consistency groups, and the storage resources included in such groups, that are associated with a particular storage array. For instance, using diagram 100 as an example, the system may initiate a command to identify storage resources 180A and 180B, are part of consistency group A 185A; storage resources 180C and 180D, are part of consistency group B 185B; storage resources 180E and 180F, are part of consistency group C 185C; and storage resources 180G and 180H, are part of consistency group D 185D.

As described, as part of a data protection policy, the system may continuously create point-in-time copies (e.g. snapshots) of the storage resources using consistency groups. Accordingly, the system may categorize such consistency groups as part of a process to coordinate the backup management associated with storage arrays that implement different types of replication.

For example, in 203, the system may determine, for each of the consistency groups, a type of replication (or replication type) implemented by the storage array providing the storage resources of the corresponding consistency group. For instance, using the example of diagram 100, for each of consistency groups 185A and 185B, the system may determine the type (or mode, technique, etc.) of replication implemented by storage array A 190A (e.g. the storage array providing storage resources 180A-D). For example, the system may determine that storage array A 190A is a first type of storage array that implements a first type of replication (or a first replication type). In some embodiments, the system may determine whether the replication type supports certain types of processing of point-in-time copies (e.g. snapshots). For example, snapshots may be bookmarked. As referred to herein, in some embodiments, a bookmark may include a label (or identifier) that is applied to a point-in-time copy (e.g. snapshot) such that the copy can be explicitly identified (e.g. called) during a recovery processes. For example, a particular bookmark may be identified to access a particular snapshot.

Accordingly, a bookmarked snapshot may be replicated. In some implementations, snapshots of multiple consistency groups may be bookmarked in parallel (e.g. via a parallel bookmark). As referred to herein, in some embodiments, a parallel bookmark may include a label (or identifier) that may be applied to a single point-in-time across multiple consistency groups. For example, a parallel bookmark may enable the system to apply a bookmark with the same name to a single point-in-time for multiple consistency groups (e.g. a group set).

Accordingly, the system may determine whether the replication type supports parallel bookmarks. If the replication type of the storage array does not support parallel bookmarks, the system may create an alternative type of bookmark such as one or more sequential bookmarks as further described below. For example, the system may determine whether the storage array implements snap-based replication. For instance, snap-based replication may create point-in-time consistent snaps of consistency groups, and use the snaps to synchronize the production volumes with the copy (or replicated) volumes. However, snap-based replication may not support parallel bookmarks. Accordingly, in some embodiments, the system may determine the first replication type does not support parallel bookmarks based on the determination the storage array implements snap-based replication.

Continuing with the example of diagram 100, for consistency groups 185C and 185D, the system may determine the type of replication implemented by storage array B 190B. For example, the system may determine that storage array B 190B is a second type of storage array that implements a second type of replication (or second replication type). For example, the system may determine the second replication type supports parallel bookmarks. For example, a non-snap-based replication may support parallel bookmarks. Accordingly, in some embodiments, the system may determine the second replication type supports parallel bookmarks based on the determination the storage array implements a non-snap-based replication (e.g. replication mode other than snap-based).

It should be noted that the system may identify any type of replication technique or mode that may be implemented by a data protection system. For example, additional types of replication identified by the system may include transactional replication, merge replication, heterogeneous replication, peer-to-peer transactional replication, etc. In addition, identifying the type of replication may also include identifying any other attributes (or characteristics, features, etc.) that may be associated with a replication technique or storage array. Accordingly, the system may determine whether the type of replication, or associated attributes, supports parallel bookmarks. For example, the system may determine whether the type of replication is synchronous or asynchronous. In some embodiments, the system may determine a storage array implementing synchronous replication supports parallel bookmarks, and a storage array implementing asynchronous replication does not support parallel bookmarks.

Accordingly, the system may categorize (or associate, allocate, etc.) the consistency groups based on the determined replication types.

More specifically, in 204, the system may add, for each of the consistency groups, the consistency group to a first group set or a second group set based on the type of replication implemented by the storage array providing the storage resources of the consistency group. As described, a group set may include a collection of consistency groups. For example, group sets may be used for consistency groups that are dependent upon one another or that operate together as a single unit. For example, using the example of diagram 100, a first group set may include consistency groups 185A, and 185B. In some embodiments, a consistency group may be included in a particular group set based on whether the associated storage array (e.g. the storage array providing the storage resources of the consistency group) implements (or uses) a replication type that supports parallel bookmarks. For example, the system may determine whether the associated storage implements snap-based replication. If the associated storage array does not support parallel bookmarks (e.g. uses snap-based replication), the system may instead create sequential bookmarks. Accordingly, in some embodiments, the first group set may correspond to a group set associated with sequential bookmarks (e.g. sequential group set).

In some embodiments, operation 204 may include a further processing for each consistency group.

For example, in 205, adding a consistency group to the first group set may include adding the consistency group to the first group set (e.g. sequential group set), in response to determining the type of replication implemented by the storage array providing the storage resources of the consistency group comprises a first type of replication. In some embodiments, the first type of replication may not support parallel bookmarks. In some embodiments, determining the type of replication implemented by the storage array does not support parallel bookmarks may be based on the storage array implementing snap-based replication. For instance, again using the example of diagram 100, the system may add consistency groups 185A, and 185B, to the sequential group set in response to determining that storage array A 190A implements snap-based replication. Accordingly, the system may perform a specialized processing for snap-based replication storage arrays. For example, some implementations of snap-based replication do not support parallel bookmarks, and thus, the system may identify storage resources associated with snap-based replication and process them in similar (or synthetic, comparable, etc.) manner by creating sequential bookmarks. In some embodiments, the sequence of bookmarks may be at time points that immediately follow each other, and thus, create a set of bookmarks that mimic a single parallel bookmark.

Accordingly, in some embodiments, the system may perform a specialized processing for snap-based replication, and leverage the use of parallel bookmarks for non-snap-based replication storage arrays.

For example, in some embodiments, in 206, adding a consistency group to the second group set may include adding the consistency group to the second group set (e.g. parallel group set), in response to determining the type of replication implemented by the storage array providing the storage resources of the consistency group comprises a second type of replication. In some embodiments, the second type of replication may support parallel bookmarks. In some embodiments, determining the type of replication implemented by the storage array supports parallel bookmarks may be based on the storage array implementing a non-snap-based replication. For instance, the system may add consistency groups 185C, and 185D (e.g. consistency groups associated with storage array B 190A) to the parallel group set in response to determining that storage array B 190B implements non-snap-based replication.

Accordingly, the system may create bookmarks based on the categorized group sets. Before creating the bookmarks, in some embodiments, the system may initiate a quiesce (or pause, disable, inactivate, etc.) operation (or command, procedure, etc.) for the database. In general, the quiesce operation allows the database to remain in a consistent state to allow the system to create bookmarks. For example, a quiesce command may perform various operations to achieve a consistent state of the database or storage resources in preparation for creating bookmarks. For example, the system may initiate a quiesce operation for the database prior to creating one or more sequential bookmarks and/or parallel bookmarks.

Once the database is in a quiesced state, the system may create bookmarks for point-in-time copies (e.g. snapshots) of data stored by the storage resources of the storage arrays. The system may create a particular type of bookmark (e.g. sequential vs. parallel) for particular group sets based on the type of replication associated with the group set.

More specifically, in 207, the system may create a set of sequential bookmarks associated with the first group set (e.g. sequential group set). In some embodiments, the set of sequential bookmarks may identify a sequence of point-in-time copies of data stored within the storage resources of the sequential group set. As described, the sequence of bookmarks may be at time points that immediately follow each other, and thus, create a set of bookmarks that mimic a single parallel bookmark. For instance, using diagram 100 as an example, a set of sequential bookmarks may be created for the group set including consistency groups 185A, and 185B.

In 208, the system may create a parallel bookmark associated with the second group set (e.g. parallel group set). In some embodiments, the parallel bookmark may identify a particular point-in-time copy of data stored within storage resources of the parallel group set. In some embodiments, the parallel bookmark associated with the second group set may comprise a single bookmark or bookmark name. For instance, using diagram 100 as an example, a bookmark with a particular name may be used to reference a point-in-time copy of the group set including consistency groups 185C and 185D (e.g. storage resources 180E-180H).

Once the bookmarks have been created, the system may initiate an unquiesce operation for the database. For example, the system may initiate the unquiesce operation after creating one or more sequential bookmarks and/or parallel bookmarks.

In 209, the system may initiate a data protection operation associated with the database based on the set of sequential bookmarks or the parallel bookmark. For example, the data protection operation may include storing one or more additional copies (or backups) of the snapshots created of the storage resources. For instance, the system may create a disaster recovery copy of a particular snapshot of a storage resource, consistency group, or group set by specifying a particular bookmark. As another example, the system may initiate the recovery of a particular storage resource, consistency group, or group set to a particular point-in-time by referencing a particular bookmark that was created. For instance, continuing the example of diagram 100, the system may specify (e.g. via an input from a user such as a storage administrator) the created set of sequential bookmarks associated with the first group set, including consistency groups 185A and 185B, to recover storage resources 180A-180D. Similarly, the system may specify the created parallel bookmark (e.g. the single bookmark) associated with the second group set, including consistency groups 185C and 185D, to recover storage resources 180E-180H.

Figure 3:
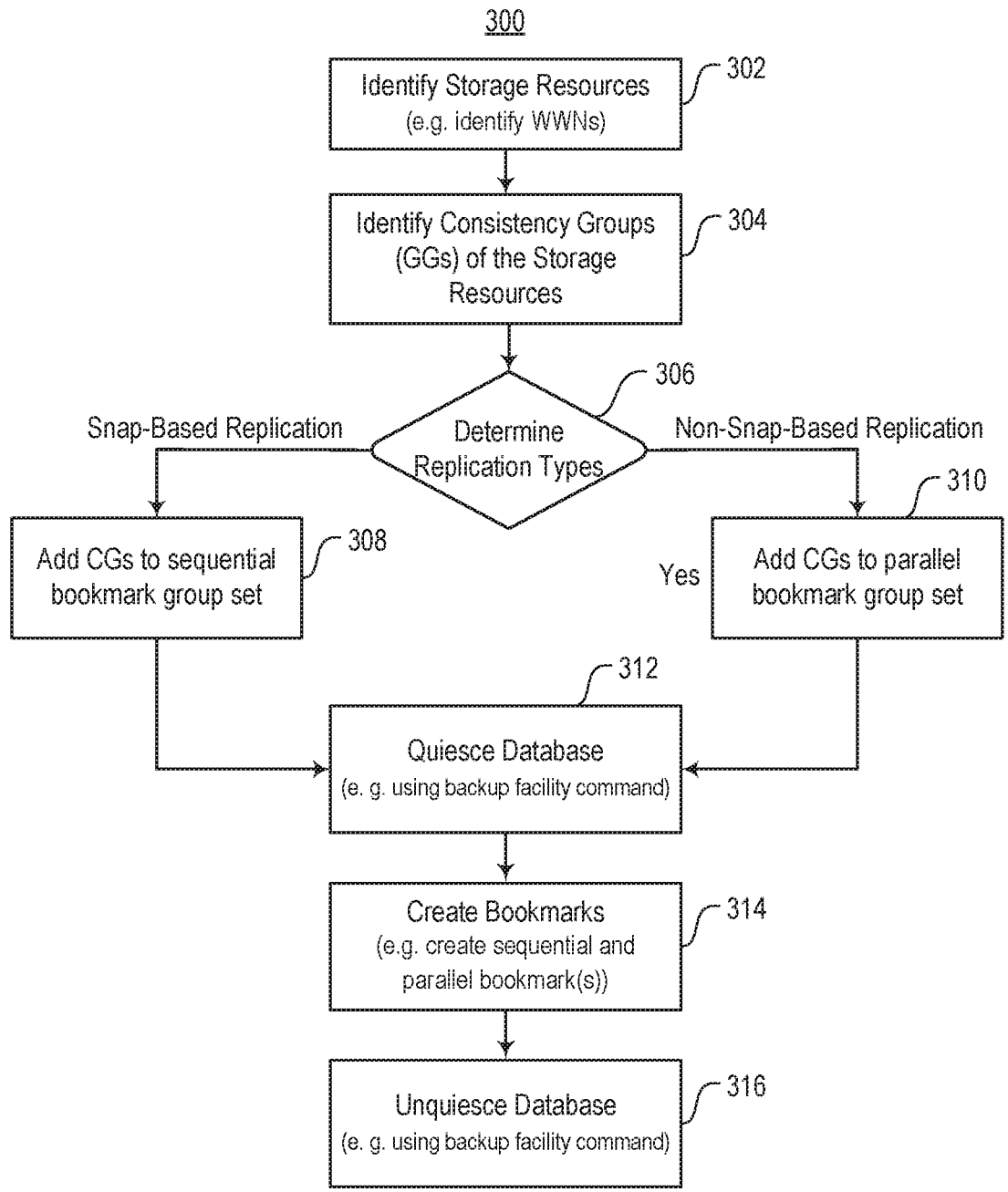
FIG. 3 is a process flow diagram illustrating an example process for categorizing consistency groups based on a type of the replication according to one or more embodiments of the disclosure.

FIG. 3 is a process flow diagram 300 illustrating an example process flow for categorizing consistency groups based on a type of the replication according to one or more embodiments of the disclosure. Process 300 may use processing logic, which may include software, hardware, or a combination thereof. For example, process 300 may be performed by a system including one or more components (e.g. replication application 175) described in operating environment 100.

As shown, in 302, the system may identify storage resources. For example, the system may identify storage resources that are associated with a particular backup facility. In some embodiments, identifying storage resources may include identifying worldwide network names (WWNs) of one or more LUNs that are used as the underlying storage for a database of the backup facility. In 302, the system may identify consistency groups of the storage resources. Once the consistency groups are identified, in 306, the system may determine replication types (or modes, techniques, etc.) implemented by an associated storage array. For example, an associated storage array made include the storage array that is associated with the storage resources (e.g. LUNs) of the particular consistency group. For example, the system may determine whether the replication type supports parallel bookmarks. In some embodiments, determining whether a storage array supports parallel bookmarks may include determining whether the storage array implements a particular type of replication mode (e.g. replication type) such as snap-based replication. As described, in some implementations, snap-based replication may not support parallel bookmarks. Accordingly, as shown in 308, if the system determines the storage array associated with a particular consistency group implements snap-based replication, the system may add the particular consistency to a sequential bookmark group set. For example, the sequential bookmark group set may include a collection of consistency groups that do not support parallel bookmarks. In other words, in some embodiments, consistency groups that do not support parallel bookmarks, may be group together such that instead of creating parallel bookmarks for such consistency groups, sequential bookmarks are created instead. Alternatively, the system may determine the replication type supports parallel bookmarks. For example, as shown in 310, if the system determines the storage array implements a non-snap-based replication (e.g. a replication mode other than snap-based), the particular consistency group may be added to the parallel bookmark group set. In some embodiments, the system may also determine that the particular type of storage array supports parallel bookmarks.

Once the consistency groups are categorized, the system may quiesce (or pause, deactivate, etc.) the database in 312. For example, the system may quiesce the database using a particular command associated with a storage component (e.g. database manager) of the backup facility. Accordingly, in 314, the system may create bookmarks (e.g. identify particular snapshots) as part of a backup process. For example, creating bookmarks allows the system to rollback (or recover) the database (or particular storage resources, consistency groups, or group sets) to a particular point in time corresponding to the bookmark. In some embodiments, creating the bookmarks may include creating one or more sequential bookmarks corresponding to the consistency groups of the sequential bookmark group set, and creating one or more parallel bookmarks corresponding to the consistency groups of the parallel bookmark group set. Once the bookmarks are created, the system may unquiesce (e.g. resume, activate, etc.) the database 316. For example, the system may unquiesce the database using a particular command associated with a storage component (e.g. database manager) of the backup facility. Accordingly, in some embodiments, process 300 allows the system may perform a backup coordination for multiple types of storage arrays that support different replication modes.

Figure 4:
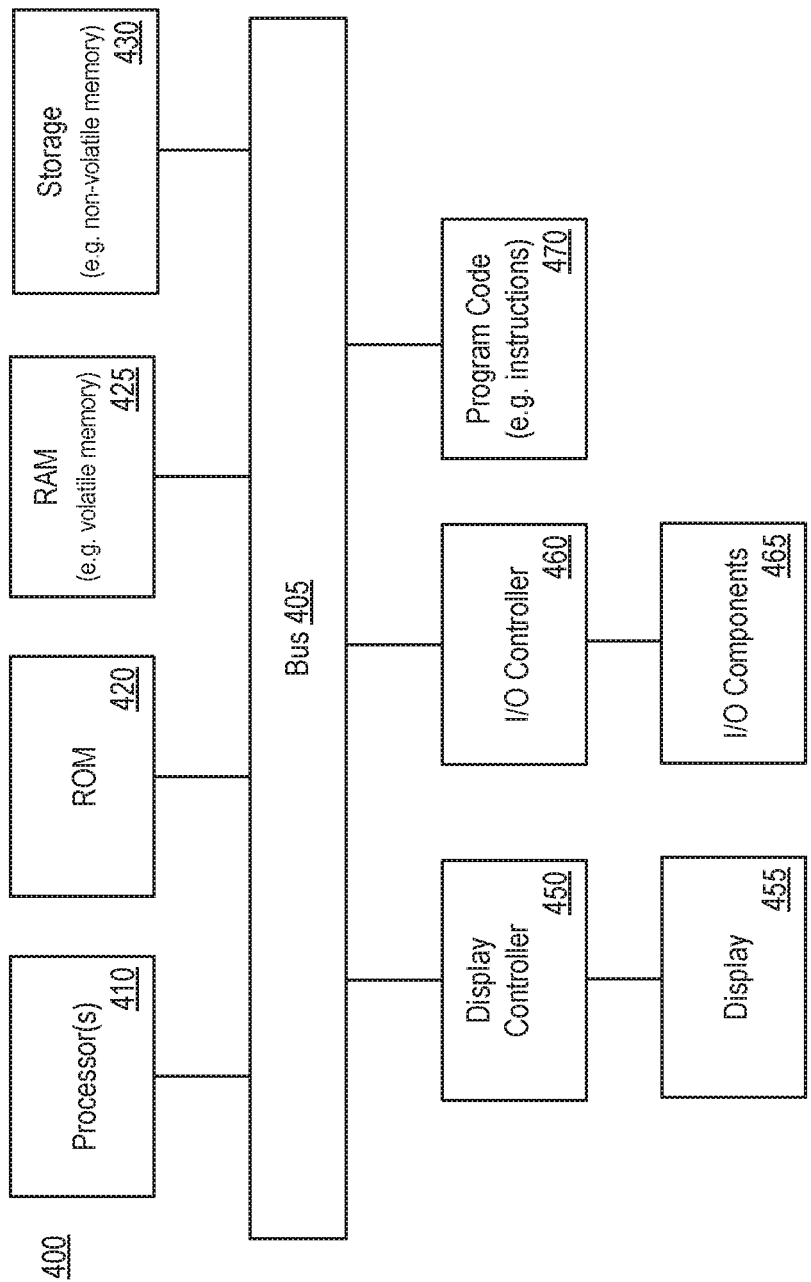
FIG. 4 is a block diagram illustrating an example computing system that may be used in conjunction with one or more embodiments of the disclosure.

FIG. 4 shows a block diagram of an example of a computing system that may be used in conjunction with one or more embodiments of the disclosure. For example, computing system 400 (or system, or server, or computing device, or device) may represent any of the devices or systems (e.g. replication application 175, backup facility 160, storage array 190, etc.) described herein that perform any of the processes, operations, or methods of the disclosure. Note that while the computing system 400 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 400 may include a bus 405 which may be coupled to a processor 410, ROM (Read Only Memory) 420, RAM (or volatile memory) 425, and storage (or non-volatile memory) 430. The processor(s) 410 may retrieve stored instructions from one or more of the memories 420, 425, and 430 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 410 may perform operations in an on-demand or "cloud computing" environment or as a service (e.g. within a "software as a service" (SaaS) implementation). Accordingly, the performance of operations may be distributed among the one or more processors 410, whether residing only within a single machine or deployed across a number of machines. For example, the one or more processors 410 may be located in a single geographic location (e.g. within a home environment, an office environment, or a server farm), or may be distributed across a number of geographic locations. The RAM 425 may be implemented as, for example, dynamic RAM (DRAM), or other types of memory that require power continually in order to refresh or maintain the data in the memory. Storage 430 may include, for example, magnetic, semiconductor, tape, optical, removable, non-removable, and other types of storage that maintain data even after power is removed from the system. It should be appreciated that storage 430 may be remote from the system (e.g. accessible via a network).

A display controller 450 may be coupled to the bus 405 in order to receive display data to be displayed on a display device 455, which can display any one of the user interface features or embodiments described herein and may be a local or a remote display device. The computing system 400 may also include one or more input/output (I/O) components 465 including mice, keyboards, touch screen, network interfaces, printers, speakers, and other devices. Typically, the input/output components 465 are coupled to the system through an input/output controller 460.

Program code 470 may represent any of the instructions, applications, software, libraries, toolkits, modules, components, engines, units, functions, logic, etc. as described herein (e.g. replication application 175). Program code 470 may reside, completely or at least partially, within the memories described herein (e.g. non-transitory computer-readable media), or within a processor during execution thereof by the computing system. Program code 470 may include both machine code, such as produced by a compiler, and files containing higher-level or intermediate code that may be executed by a computing system or other data processing apparatus (or machine) using an interpreter. In addition, program code 470 can be implemented as software, firmware, or functional circuitry within the computing system, or as combinations thereof. Program code 470 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
   one or more processors; and
   a non-transitory computer readable medium storing a plurality of instructions, which when executed, cause the one or more processors to:
   identify storage resources of a backup facility that maintains a database, the backup facility associated with one or more storage arrays that provide the storage resources for the database;
   identify a set of consistency groups defined amongst the storage resources;
   determine, for each of the consistency groups, a type of replication implemented by the storage array providing the storage resources of the consistency group;
   add, for each of the consistency groups, the consistency group to a first group set or a second group set based on the type of replication implemented by the storage array providing the storage resources of the consistency group;
   create a set of sequential bookmarks associated with the first group set, the set of sequential bookmarks identifying a sequence of point-in-time copies of data stored within the storage resources of the first group set;
   create a parallel bookmark associated with the second group set, the parallel bookmark identifying a particular point-in-time copy of data stored within storage resources of the second group set; and
   initiate a data protection operation associated with the database based on the set of sequential bookmarks or the parallel bookmark.

2. The system of claim 1, wherein adding the consistency group to a first group set or a second group set includes:
   adding the consistency group to the first group set, in response to determining the type of replication implemented by the storage array providing the storage resources of the consistency group does not support parallel bookmarks; and
   adding the consistency group to the second group set, in response to determining the type of replication implemented by the storage array providing the storage resources of the consistency group supports parallel bookmarks.

3. The system of claim 2, wherein determining the type of replication implemented by the storage array does not support parallel bookmarks is based on the storage array implementing snap-based replication.

4. The system of claim 2, wherein determining the type of replication implemented by the storage array supports parallel bookmarks is based on the storage array implementing a non-snap-based replication.

5. The system of claim 1, wherein the plurality of instructions, when executed, further cause the one or more processors to:
   initiate a quiesce operation for the database prior to creating the set of sequential bookmarks and the parallel bookmark; and
   initiate an unquiesce operation for the database after creating the set of sequential bookmarks and the parallel bookmark.

6. The system of claim 1, wherein the parallel bookmark associated with the second group set comprises a single bookmark.

7. The system of claim 1, wherein identifying storage resources of the backup facility that maintains the database includes:
   identifying, using a command associated with the backup facility, a world wide name (WWN) of the storage resources associated with the backup facility.

8. A method comprising:
   identifying storage resources of a backup facility that maintains a database, the backup facility associated with one or more storage arrays that provide the storage resources for the database;
   identifying a set of consistency groups defined amongst the storage resources;
   determining, for each of the consistency groups, a type of replication implemented by the storage array providing the storage resources of the consistency group;
   adding, for each of the consistency groups, the consistency group to a first group set or a second group set based on the type of replication implemented by the storage array providing the storage resources of the consistency group;
   creating a set of sequential bookmarks associated with the first group set, the set of sequential bookmarks identifying a sequence of point-in-time copies of data stored within the storage resources of the first group set;
   creating a parallel bookmark associated with the second group set, the parallel bookmark identifying a particular point-in-time copy of data stored within storage resources of the second group set; and
   initiating a data protection operation associated with the database based on the set of sequential bookmarks or the parallel bookmark.

9. The method of claim 8, wherein adding the consistency group to a first group set or a second group set includes:
   adding the consistency group to the first group set, in response to determining the type of replication implemented by the storage array providing the storage resources of the consistency group does not support parallel bookmarks; and
   adding the consistency group to the second group set, in response to determining the type of replication implemented by the storage array providing the storage resources of the consistency group supports parallel bookmarks.

10. The method of claim 9, wherein determining the type of replication implemented by the storage array does not support parallel bookmarks is based on the storage array implementing snap-based replication.

11. The method of claim 9, wherein determining the type of replication implemented by the storage array supports parallel bookmarks is based on the storage array implementing a non-snap-based replication.

12. The method of claim 8, further comprising:
 initiating a quiesce operation for the database prior to creating the set of sequential bookmarks and the parallel bookmark; and
 initiating an unquiesce operation for the database after creating the set of sequential bookmarks and the parallel bookmark.

13. The method of claim 8, wherein the parallel bookmark associated with the second group set comprises a single bookmark.

14. The method of claim 8, wherein identifying storage resources of the backup facility that maintains the database includes:
 identifying, using a command associated with the backup facility, a world wide name (WWN) of the storage resources associated with the backup facility.

15. A computer program product comprising a non-transitory computer-readable medium having a computer-readable program code embodied therein to be executed by one or more processors, the program code including instructions to:
 identify storage resources of a backup facility that maintains a database, the backup facility associated with one or more storage arrays that provide the storage resources for the database;
 identify a set of consistency groups defined amongst the storage resources;
 determine, for each of the consistency groups, a type of replication implemented by the storage array providing the storage resources of the consistency group;
 add, for each of the consistency groups, the consistency group to a first group set or a second group set based on the type of replication implemented by the storage array providing the storage resources of the consistency group;
 create a set of sequential bookmarks associated with the first group set, the set of sequential bookmarks identifying a sequence of point-in-time copies of data stored within the storage resources of the first group set;
 create a parallel bookmark associated with the second group set, the parallel bookmark identifying a particular point-in-time copy of data stored within storage resources of the second group set; and
 initiate a data protection operation associated with the database based on the set of sequential bookmarks or the parallel bookmark.

16. The computer program product of claim 15, wherein adding the consistency group to a first group set or a second group set includes:
 adding the consistency group to the first group set, in response to determining the type of replication implemented by the storage array providing the storage resources of the consistency group does not support parallel bookmarks; and
 adding the consistency group to the second group set, in response to determining the type of replication implemented by the storage array providing the storage resources of the consistency group supports parallel bookmarks.

17. The computer program product of claim 16, wherein determining the type of replication implemented by the storage array does not support parallel bookmarks is based on the storage array implementing snap-based replication.

18. The computer program product of claim 16, wherein determining the type of replication implemented by the storage array supports parallel bookmarks is based on the storage array implementing a non-snap-based replication.

19. The computer program product of claim 15, wherein the program code includes further instructions to:
 initiate a quiesce operation for the database prior to creating the set of sequential bookmarks and the parallel bookmark; and
 initiate an unquiesce operation for the database after creating the set of sequential bookmarks and the parallel bookmark.

20. The computer program product of claim 15, wherein the parallel bookmark associated with the second group set comprises a single bookmark.

* * * * *